Figure 1:
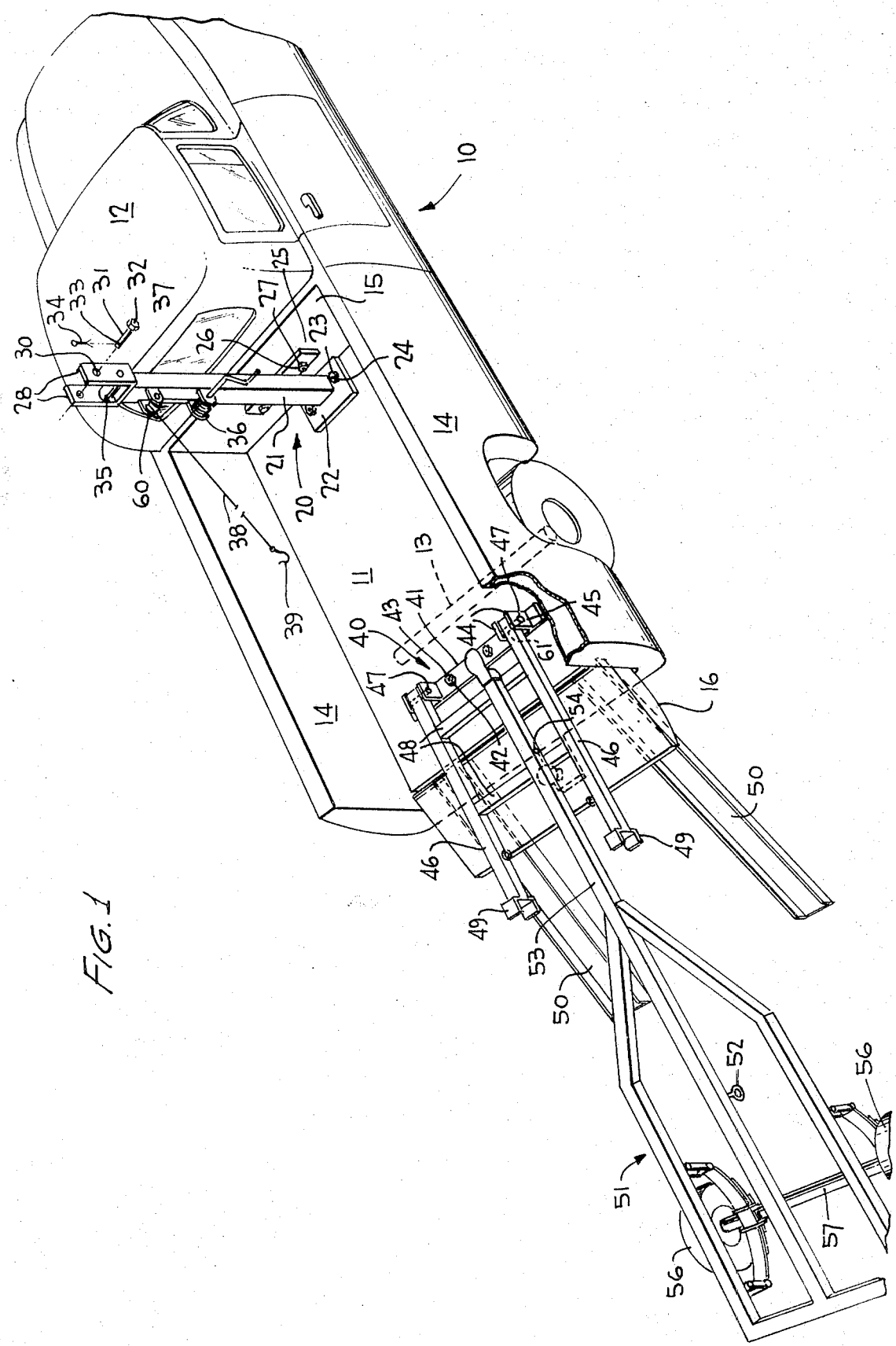

United States Patent [19]

Pihlgren

[11] 3,843,002

[45] Oct. 22, 1974

[54] BOAT AND TRAILER LOADING DEVICE

[76] Inventor: Carl O. Pihlgren, Box 4, Wadsworth, Nev. 89442

[22] Filed: July 11, 1972

[21] Appl. No.: 270,685

[52] U.S. Cl. .............................. 214/450, 214/85.1
[51] Int. Cl. ............................................. B60r 9/08
[58] Field of Search ............ 214/450, 85, 85.1, 502, 214/85.5; 296/1 A

[56] References Cited
UNITED STATES PATENTS

| | | |
|---|---|---|
| 3,048,291 | 8/1962 | Mabry ................................ 214/450 |
| 3,343,696 | 9/1967 | Morrison ............................ 214/450 |
| 3,550,800 | 12/1970 | Robinson ........................... 214/450 |
| 3,648,866 | 3/1972 | Slown ................................ 214/450 |

Primary Examiner—Albert J. Makay
Attorney, Agent, or Firm—Roylance, Abrams, Berdo & Kaul

[57] ABSTRACT

Apparatus mounted on a pick-up truck for carrying a boat and boat trailer thereon which includes a front post for supporting the front portion of the boat trailer and a rear rotating hinge assembly for engaging and lifting the rear portion of the boat trailer.

4 Claims, 3 Drawing Figures

BOAT AND TRAILER LOADING DEVICE

This invention relates to an apparatus for carrying a boat over land and more particularly it relates to an apparatus for carrying a boat and a trailer on a pick-up truck.

The usual manner of transporting a light boat is by mounting the boat on a trailer and connecting the trailer to the back of a vehicle such as a truck or a car. However, this type of arrangement prohibits the transportation of an additional trailer behind the vehicle. Other prior art devices provide mounting apparatus for carrying a boat only on the rear of a truck without a trailer. However, without the trailer the launching of the boat into the water and the manipulation of the boat on the ground is a difficult task. Additionally, these prior art devices are complicated in construction. Due to this fact the ready use of the truck for its normal hauling functions is prevented unless the carrying structure is dismantled, which can be a complex, time-consuming project.

It is an object of the present invention to overcome the limitations and drawbacks associated with the aforesaid prior art devices and to provide a new and improved carrying apparatus for a boat and trailer.

Another object of the present invention is to provide a boat and trailer apparatus which can carry the boat and trailer and also allow an additional boat and trailer or other type of trailer to be transported at the same time.

Another object of the present invention is to provide an apparatus for transporting a boat and boat trailer so that the boat, which can be carrying a motor, gas tanks, various fishing gear and other equipment, and the boat trailer are both completely mounted on the vehicle that is transporting them.

Another object of the present invention is to provide an apparatus on a pick-up truck for carrying a boat and trailer thereon wherein the apparatus allows the pick-up truck to be quickly converted from a boat and trailer carrier to a cargo hauling truck.

Other objects, advantages, and salient features of the present invention will become apparent from the following detailed description, which, taken in conjunction with the annexed drawing, discloses a preferred embodiment of the present invention.

Figure 2:
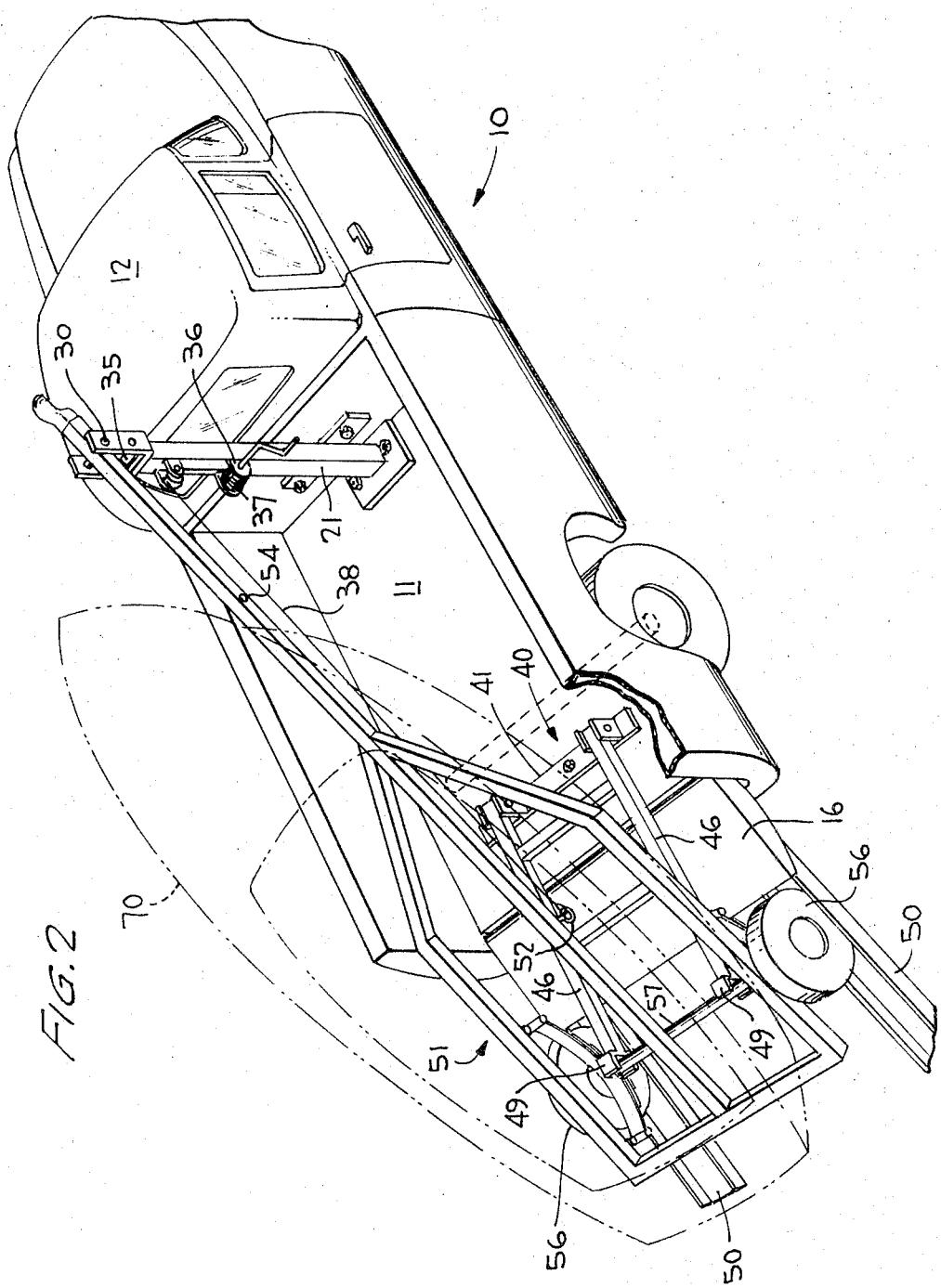
Figure 3:
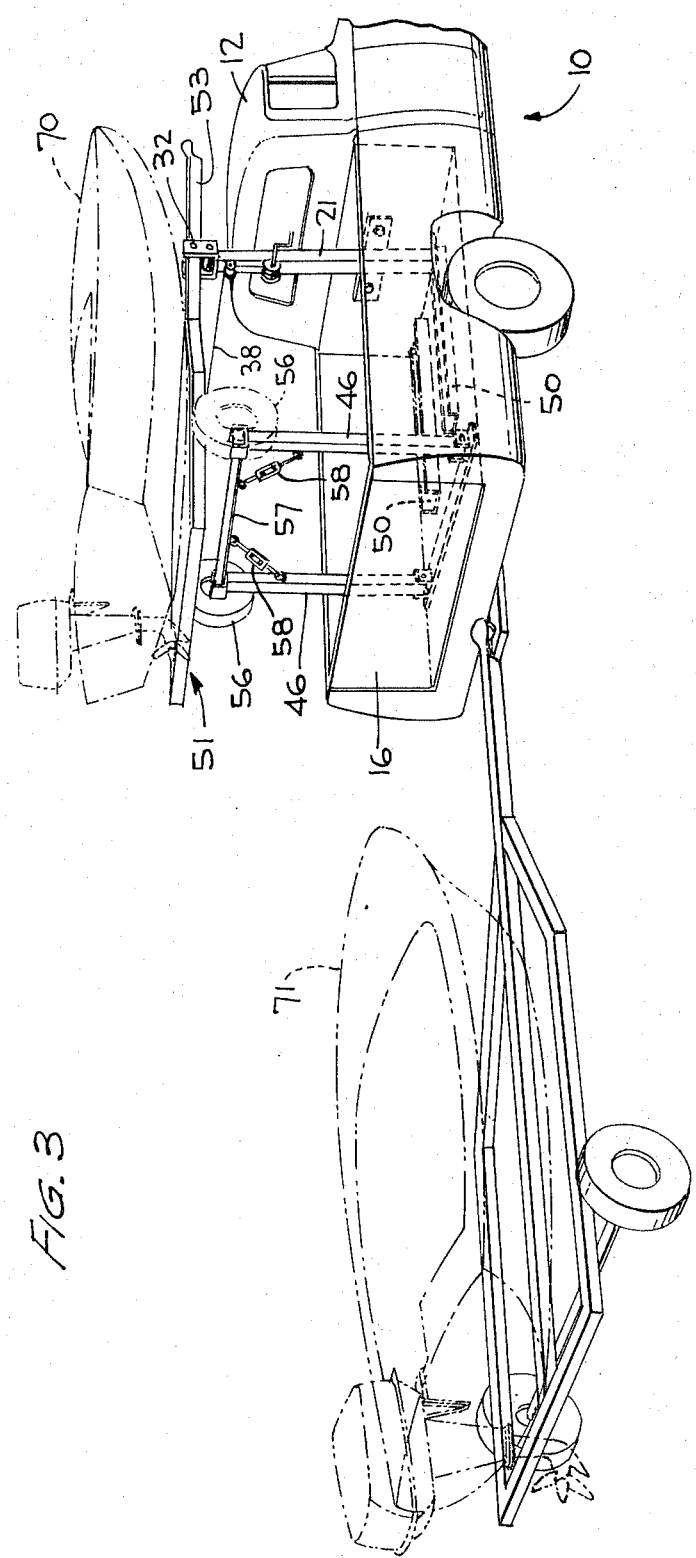

Referring now to the drawings, which form a part of this original disclosure:

FIG. 1 is a perspective view of the apparatus in accordance with the principles of the present invention;

FIG. 2 is a perspective view of the apparatus in accordance with the principles of the present invention showing a boat and trailer in the process of being mounted thereon; and FIG. 3 is a perspective view of the apparatus in accordance with the principles of the present invention with the boat and trailer mounted on the apparatus and an additional boat and trailer connected to the rear of the truck.

The foregoing objects are obtained by utilizing a forward post, having a winch thereon, located adjacent the cab of a pick-up truck and a rotating hinge assembly mounted adjacent the rear end of the pick-up truck. The winch mounted on the forward post is attached by a cable to the trailer. The winding in of the cable moves the trailer up specially provided ramps towards the front of the truck. The support bar of the trailer moves along the top of the forward post and the rear axle of the trailer is engaged by U-shaped members on the rear rotating hinge assembly and is rotated upwardly under the drive of the winch. In the mounted position the main support bar of the trailer is mounted on the top of the front post and the rear axle of the trailer is mounted on the U-shaped members of the rear hinged rotating assembly which assembly is in an upright position.

Referring to the drawings in further detail, the device of the present invention consists of a forward post 20 and a rear hinged rotating assembly 40 as seen in FIG. 1. Preferably, a pick-up truck designated 10 is utilized to mount the present invention. The pick-up truck is of a conventional type having a flat rear portion or bed 11. The front of the bed 11 is located adjacent the cab 12 and extends rearwardly beyond the rear axle 13 of the pick-up truck 10. On opposite sides of the bed 11 are a pair of upstanding side walls 14 and at the forward end of the bed 11, adjacent the cab 12, is an upstanding wall 15 connected between the side walls 14. At the rear end of the bed 11 is a hinged tailgate 16 which can be folded down as shown in FIG. 1 or raised up as shown in FIG. 3.

The trailer designated 51 carries a light boat 70. The trailer can be any conventional boat trailer having a center support bar 53, an axle 57 mounted at the rear of the support bar and wheels 56, one each mounted rotatably at each end of the axle 57. Midway along the support bar 53 and depending downwardly is a ring 52. Located between the ring 52 and the front of the support bar 53 is a horizontally disposed transverse aperture 54 passing completely through the support bar 53.

Mounted centrally on the bed 11 adjacent the cab 12 of the pick-up truck is the forward post 20. The forward post 20 consists of an elongated rod member 21 which is mounted perpendicularly to the bed 11 at its lower end. The top portion of the rod 21 is above the roof of the cab 12. A plate 22 is rigidly secured to the bottom of the rod member 21. The plate 22 is connected to the bed 11 of the pick-up truck by means of bolts 23 which pass through apertures 24 in the plate 22 and into the bed 11. Midway along the rod member 21 is mounted a transverse mounting member 25 in the form of an elongated bar. This member 25 midway along its length is rigidly secured to the rod member 21 and is additionally rigidly secured to the wall 15 by means of bolts 26 passing through apertures 27 therein and entering the wall 15. At the topmost portion of the rod member 21 there are two spaced extensions 28 and 29 in the form of rectangular plates. These extensions are parallel to each other and to the rod member 21, have a thickness less than that of the rod member 21 and define a space between them for receiving the support bar 53 of the trailer. The extensions are integrally formed with the rod member 21. Centrally located in each of the extensions 28 and 29 there is an aperture 30 and through these apertures 30 a locking pin 31 can be moved and secured. The locking pin 31 has a length slightly greater than the distance between the outer portions of the extensions 28 and 29, has an enlarged head 32 at one end and a transverse aperture 33 at the other end for receiving a cotter pin 34.

Mounted on the rod member 21 in the space defined by the extensions 28 and 29 is a roller 35. The roller 35 is rotatably mounted between the extensions 28 and 29 in a suitable manner at a position below the apertures 30.

Mounted midway along the rod member 21 on the side opposite the mounting member 25 is a winch 36 having a drum 37 as shown in FIG. 1. Wound on the drum 37 is a cable 38 having a hook 39 at its free end. Mounted in a suitable manner just below the roller 35 on the rod member 21 is a roller 60 for guiding engagement with the cable 38.

Mounted above the rear axle 13 of the pick-up truck 10 on the bed 11 is a support plate 41 having apertures 42 spaced along its length. Bolts 43 pass through the apertures 42 in the support plate 41 and secure the support plate rigidly to the pick-up truck bed 11. At each end of the support plate 41 adjacent the sides of the pick-up truck 10 there are located two spaced upstanding plates 44 having apertures 45 centrally located therein. Because the support plate 41 is located above the truck axle 13, all weight applied thereto by the rear rotating hinge assembly 40 can be readily supported by the truck suspension system.

Two elongated support rods 46 are rotatably mounted on the support plate 41 for rotation about an axis which is perpendicular to the longitudinal axis of the pick-up truck. At one end of each of the support rods 46 there is a transverse aperture 61. The aperture 61 in each of the support rods 46 is aligned with the apertures 45 in the plates 44 and a rod 47 passes through the aligned apertures to rotatably attach the support rods 46 to the support plate 41. Rods 46 are connected to each other by means of reinforcing rods 48 which are parallel to each other and spaced from each other and are connected at their respective ends to each rod 46. At the end of each support rod 46 opposite the rotatably mounted end is a U-shaped portion 49. The open end of the U-shaped portion faces away from the rotatably mounted end of the rods 46.

Removably supported on the end of the bed 11 opposite the cab 12 are two ramp members 50 which are spaced along the width of the rear of the bed 11 as shown in FIG. 1. The ramp members 50 can be adjusted until they are spaced sufficiently to receive the wheels 56 of the trailer 51.

When the pick-up truck is being used to haul material other than a boat and a trailer, the ramp members 50 can be carried on the bed 11 and the rear hinged rotating assembly 40 can be in a position flat against the bed 11 with the U-shaped portions 49 facing the front of the truck.

In operation, the trailer 51 having the boat 70 mounted thereon is moved towards the rear of the pick-up truck 10 which has the ramps 50 in place. The cable 38 is unwound from the drum 37 and the hook 39 on the cable 38 is connected to the ring 52 on the support bar 53. The winch is then operated to wind in the cable 38. The wheels 56 of the trailer are aligned with the ramps 50 so that as the cable 38 is wound on the drum 37 the wheels 56 will move up the ramps 50 as seen in FIG. 2. The front portion of the support bar 53 is manipulated to a position between the extensions 28 so that it will be engaged by the roller 35 therebetween. As the winch winds in the cable 38 the trailer and the boat will be moved towards the forward end of the the pick-up truck 10. The wheels 56 will move up the ramps 50 and the support bar 53 of the trailer will move along the roller 35 on the rod member 21 and across the top of the cab 12.

As shown in FIG. 1, the support rods 46 are rotated to a position on the bed 11 having the U-shaped portions 49 extending rearwards. In this position, the U-shaped portions 49 can engage the rear axle 57 of the trailer as it moves towards the front of the truck under the power of the winch 36. As the cable 38 continues to be wound around the drum 37, thus moving the support bar 53 forward further along the roller 35, it simultaneously causes the rear hinge assembly to rotate about the support plate 41 with the U-shaped portions 49 engaging and supporting the rear axle 57. This rotation will cause the rear axle 57 and the entire back portion of the trailer 51 to be raised upwards and rotated towards the front of the truck as the rods 46 rotate about their connection with the support plate 41. The cable 38 continues to be wound on the drum 37 until the support rods 46 are in an upright position as shown in FIG. 3. At this time the winch 36 will be stopped and the aperture 54 in the trailer support bar 53 and the apertures 30 in the extensions 28 and 29 will be aligned. The locking pin 31 is then moved through the apertures and the cotter pin 34 is moved into the aperture 33. This will secure the support bar 53 of the trailer on to the forward post assembly 20. Any suitable fastening means, such as fastening links 58, connected at one end to the axle 57 and at the other end to the rods 46 in a suitable manner, are then employed to fasten the rear axle 57 of the trailer to the support rods 46.

The ramps 50 are then placed on the truck bed 11 and boat and trailer are ready for transportation on the pick-up truck. Because the rear of the pick-up truck is free from the attachment of the trailer and the boat, an additional boat 71 and trailer or house trailer can be attached to the pick-up truck and additionally transported as shown in FIG. 3.

To remove the boat and trailer from its mounted position on the pick-up truck the steps outlined above are carried out essentially in reverse order. The ramps 50 are put into place, the locking pin 31 is removed, and the fastening links 58 connecting the rear axle 57 of the trailer to the rods 46 are removed. Then the winch 36 unwinds the cable 38 to allow the rods 46 and the trailer to rotate downwardly and the support bar to move rearwardly along the roller 35. The trailer is then rolled off the bed of the pick-up truck onto the ramps 50 and finally onto the ground.

At this time, all that is necessary to place the pick-up truck in condition for utilizing the back portion to haul material other than the boat and trailer, is to remove the ramps 50 and rotate the rods 46 to a position parallel to and resting upon the bed 11 with the U-shaped supports 49 facing towards the cab 12.

While one advantageous embodiment has been chosen to illustrate the invention, it will be understood by those skilled in the art that various changes and modifications can be made therein without departing from the scope of the invention as defined in the appended claims.

I claim:

1. An apparatus for mounting a boat trailer, which carries a boat thereon, on the rear bed of a truck comprising:

a post member rigidly mounted to said rear bed having at the top thereof two spaced apart plates defining a space therebetween, each plate having a transverse aperture therein, a roller mounted between said plates below said apertures, a locking pin movable through said apertures, a pair of spaced rod members, pivotal mounting means for pivotally mounting said rod members to said rear bed, reinforcing rod means for interconnecting said rod members, U-shaped portions mounted on said rod members for engaging said boat trailer, a winch means mounted on said post member having a cable wound thereon, said boat trailer including an elongated central support bar having a depending means located substantially midway along said support bar for engaging said winch means, and a transverse hole located in said support bar spaced from said depending means, said winch means being operative to wind said cable to pull said support bar into said space and over said roller so that said transverse hole and said apertures are aligned and further to swing said rod members from a first position substantially parallel to said rear bed to a second position substantially perpendicular to said rear bed, and said locking pin being engageable through said apertures and said transverse hole to lock said trailer onto said truck.

2. An apparatus according to claim 1 and wherein said trailer includes a rear axle mounted to said central support bar and engageable with said U-shaped portions, and two rotatable wheels mounted respectively at each end of said rear axle, and wherein locking means are provided for locking said rear axle to said rod members when said rod members are in said second position.

3. An apparatus according to claim 2 and further including ramp means, having one end engageable with said rear bed and an opposite end engageable with the ground, for receiving said wheels when said winch means moves said support bar along said post member and for guiding said rear axle into engagement with said U-shaped portions.

4. An apparatus for carrying a boat trailer, having a boat mounted thereon, on the rear bed of a truck comprising:

fixed support means for receiving one end of said boat trailer;

movable support means rotatably mounted on said truck rear bed and having a portion for receiving the other end of said boat trailer;

drive means for moving said boat trailer into engagement with said movable support means portion while said movable support means portion is in a first position adjacent to the rear bed of the truck;

said drive means further being operative to move said movable support means portion and said boat trailer to a second position spaced above the rear bed of the truck;

locking means for locking said boat trailer to at least one of said support means when said boat trailer and said movable support means portion are in said second position;

said fixed support means including a post member vertically mounted on the truck rear bed;

said movable support means including rod means connected at one end to said portion engageable with said boat trailer, said rod means having an opposite end rotatably mounted to the trunk rear bed; and said movable support means portion including U-shaped members mounted on said one end of said rod means for engagement with said boat trailer.

* * * * *